Sept. 15, 1931.      V. O. VANCE      1,823,340
FISHING TOOL
Filed Feb. 19, 1930      2 Sheets-Sheet 1
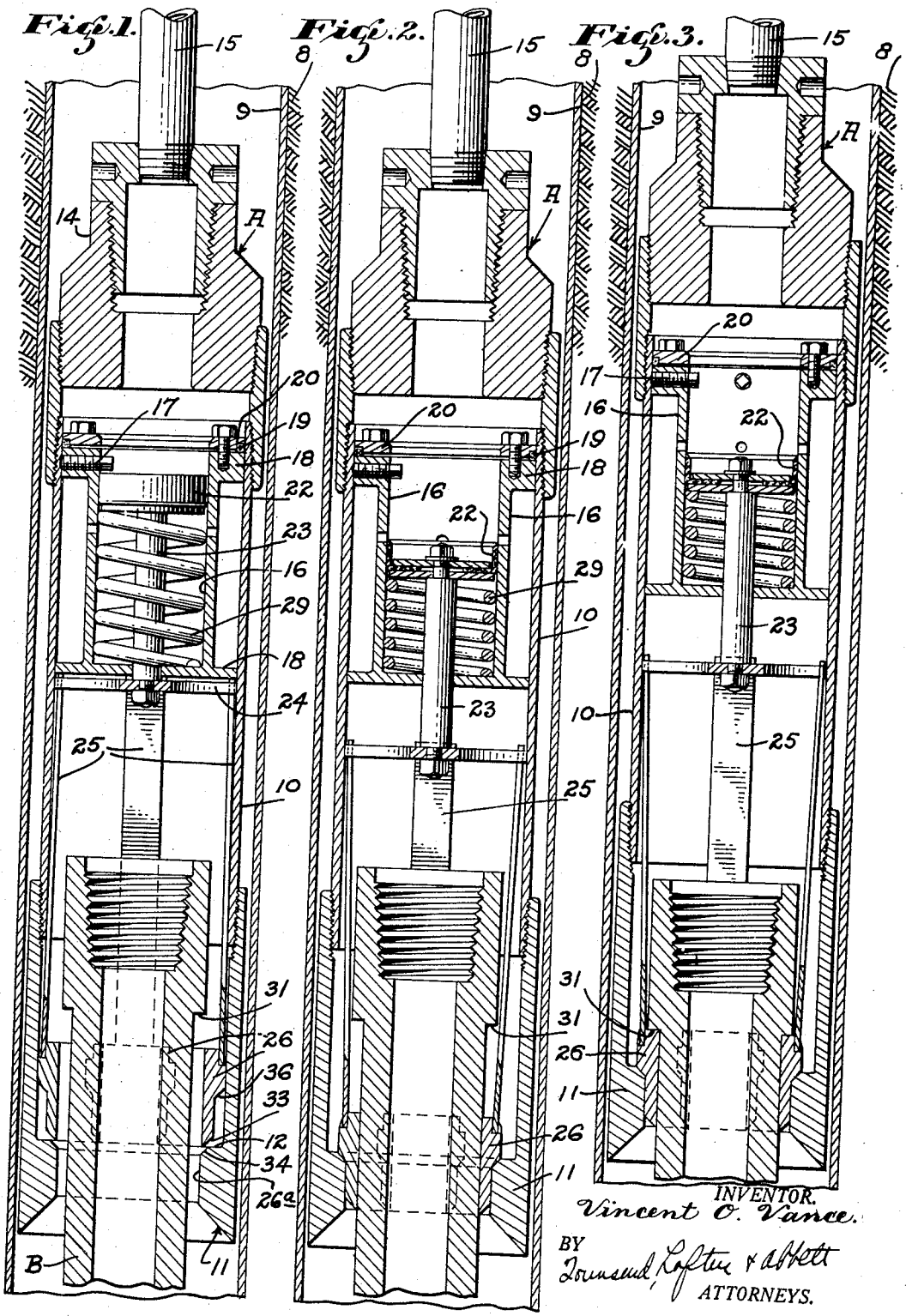

Sept. 15, 1931.  V. O. VANCE  1,823,340
FISHING TOOL
Filed Feb. 19, 1930  2 Sheets-Sheet 2

INVENTOR.
Vincent O. Vance.
BY
Townsend, Loftus & Abbett
ATTORNEYS.

Patented Sept. 15, 1931

1,823,340

UNITED STATES PATENT OFFICE

VINCENT O. VANCE, OF COLFAX, CALIFORNIA

FISHING TOOL

Application filed February 19, 1930. Serial No. 429,619.

This invention relates to auxiliary apparatus utilized during the drilling of deep wells and particularly pertains to a fishing tool for recovering parted drill stems.

It is the principal object of the present invention to generally improve the construction and operation of fishing tools of the character referred to by providing a comparatively simple fishing tool which may be quickly and positively engaged with the "fish" and so connected therewith that the "fish" may be elevated, which tool may also be quickly released from the "fish" in the event that the same is immovable.

In carrying this invention into practice I provide a fishing barrel having an overshot shoe which may be lowered over the "fish" to be recovered. A slip assembly is provided which is vertically reciprocable in the barrel and which is operatively associated with the shoe so that upon reciprocation it may be contracted into engagement with the "fish" or expanded out of engagement therewith.

One form which the invention may assume is exemplified in the following description and illustrated by way of example in the accompanying drawings, in which:

Fig. 1 is a vertical longitudinal section through a fishing tool embodying the preferred form of my invention and disclosing the same in a well as it appears during the operation of recovering the "fish."

Fig. 2 is a view similar to Fig. 1 showing the parts in a position to engage the fish.

Fig. 3 is a view similar to Fig. 1 showing the fishing tool connected with the "fish" and elevating the same.

Figure 4:
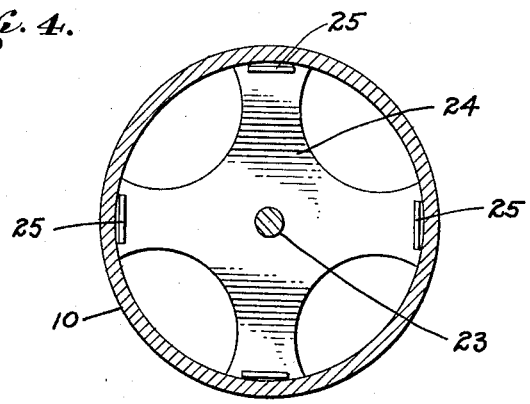
Fig. 4 is a transverse section through the fishing tool taken on line IV—IV of Fig. 1.

Referring more particularly to the accompanying drawings, 8 indicates a well bore fitted with a casing 9. Adapted to be lowered in this bore is a fishing tool indicated by the letter A. This fishing tool includes a cylindrical barrel 10 which may be formed of casing of a suitable diameter which, of course, is less than the diameter of the bore in which the tool is to be lowered. The lower end of the barrel 10 is fitted with an overshot shoe 11 having an internal shoulder 12 formed contiguous to its lower end. The upper end of the barrel 10 is fitted with a suitable sub 14 which forms a connection between the barrel and drill pipe or other conduit 15 by means of which the tool is lowered in the well.

A cylinder 16 is arranged within the barrel and is preferably secured therein by means of set screws 17. At the ends of the cylinder 16 it is formed with circumscribing flanges 18 which engage the inner periphery of the barrel 10 so as to maintain the cylinder concentrically within the barrel. An annular gasket 19 is arranged on the upper surface of the upper flange 18 and is expanded against the inner wall of the barrel 10 by means of a packing ring 20 suitably secured to the upper flange 18. This gasket is provided to form a fluid tight joint between the top of the cylinder and the inner periphery of the barrel 10.

A plunger 22 is reciprocably mounted in the cylinder 16 and is connected with one end of a plunger rod 23. The other end of the plunger rod extends through the lower end of the cylinder 16 and is fitted with a spider 24. This spider 24 is formed with four radially extending spokes which terminate short of the inner periphery of the barrel 10. An arm 25 of suitable construction is connected with the outer end of each spoke and depends downwardly therefrom.

Figure 5:
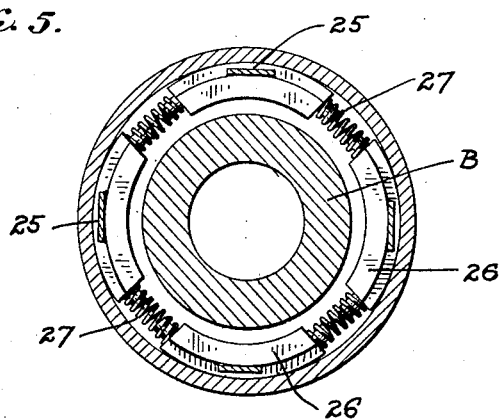
Fig. 5 is a transverse section through the fishing tool taken on line V—V of Fig. 1.
Figure 6:
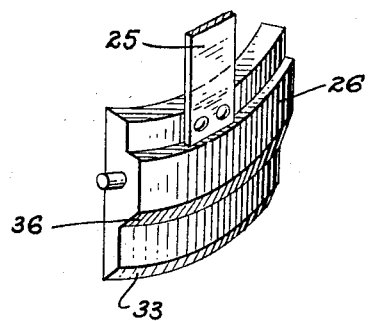
Fig. 6 is a fragmentary view in perspective of one of the slips.

The lower end of each arm 25 is fitted with a slip 26. These slips are segmental and are complemental so that when the device is assembled as illustrated the slips will form an annular slip assembly arranged concentrically about the inner periphery of the overshot shoe 11. The slips are spaced apart as shown in Fig. 5 and springs 27 are interposed between the adjacent ends of the slips and normally tend to maintain the slip assembly expanded.

In order to maintain the slips in their upper position a control spring 29 is provided which is interposed between the lower end of the cylinder 16 and the plunger 22. This spring constantly tends to maintain the plunger and consequently the slips in their uppermost position.

Reference being had to Fig. 1 it will be noticed that at the inner periphery of the shoulder 12 of the overshot shoe it is beveled as at 35 which is complemental to an annular beveled shoulder 36 formed on the slips 26 intermediate their ends and also complemental to the beveled lower ends 33 of the slips.

When the slips are in their raised positions they will, of course, be relatively expanded by the springs 27 to a diameter greater than the diameter of the reduced bore 26a in the overshot shoe which commences at the shoulder 12. Therefore, when the slips are lowered their beveled lower ends 33 engage the beveled surface 34 of the shoulder 12 and a cam action results which causes contraction of the slip assembly, so that the slips will project downwardly into the reduced bore 26a of the overshot shoe.

The extreme lower end of the shoe is conically bored from its outer diameter to the reduced bore 26a. This conical bore is for the purpose of facilitating the passing of the overshot shoe over the "fish".

In operation of the apparatus it is lowered into the well from which a "fish" is desired to be recovered. In the present instance the "fish" is indicated by B in the form of a drill stem having an annular shoulder 31. When the apparatus has been lowered into the well with the plunger 22 and the slip assembly in their uppermost positions the overshot shoe engages the upper end of the "fish". Due to the conical lower end of the shoe the upper end of the "fish" will be centered relative to the shoe and will project upwardly therein. Fluid pressure is then introduced through the stem carrying the fishing tool, which pressure will be exerted against the plunger 22 to lower the same.

As the plunger moves downwardly, its downward movement will be transmitted through the spider 24 and the arms 25 to the slip assembly. As the slips move downwardly their beveled or cam lower ends 33 will engage the beveled shoulder 34 and cause the slip assembly to be contracted around the body of the "fish" below the shoulder 31 thereon. The upper beveled shoulders on the slips will then engage the beveled shoulder 34 in the overshot shoe which will prevent the slips from passing through the shoe. Engagement of these shoulders will also enable the slips to properly engage the "fish" should there be variations in the diameter of the same.

I desire to point out that ports 32 are provided in the cylinder 16 so that after the plunger has moved an amount sufficient to properly engage the slips with the "fish" that further pressure on the cylinder will be relieved through these ports.

When the slips are in the position just described the entire fishing tool is elevated and the upper ends of the slips will engage the shoulder on the "fish". As the slips cannot move downwardly relative to the fishing tool due to their engagement with the beveled shoulder 34 in the shoe, elevation of the fishing tool will be accompanied by elevation of the "fish".

In the event that the "fish" is so tight in the hole that it cannot be elevated by the fishing tool, the fishing tool may be released from the "fish" in the following manner. The barrel is first lowered relative to the "fish" and the fluid pressure in the cylinder 16 is relieved so that the spring 29 will elevate the plunger and the slips. The slips will therefore be elevated in the barrel and the slip assembly expanded to a position where it will not engage the shoulder on the "fish". The fishing tool may then be elevated and removed from the hole.

From the foregoing it is obvious that I have provided a simple and efficient fishing tool which may be expeditiously operated to positively engage a "fish" to elevate the same in a hole. Also, in the event that it is impossible to move the "fish" the fishing tool may be quickly released therefrom and withdrawn.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A fishing tool comprising a barrel adapted to be lowered in a well, an overshot at the lower end of the barrel, gripping means in the barrel, spring means normally urging the gripping means to an expanded position and means for contracting said gripping means.

2. A fishing tool comprising a barrel adapted to be lowered in a well, an overshot at the lower end of the barrel, normally expanded gripping means in the barrel and capable of movement therein, springs engaging the gripping means to urge it to an expanded position and means for contracting said gripping means when it is moved to a predetermined position in the barrel.

3. A fishing tool comprising a barrel adapted to be lowered in a well, an overshot at the lower end of the barrel, normally expanded gripping means in the barrel and capable of movement therein, and means for contracting said gripping means when it is moved to a predetermined position in the barrel, and an abutment between the gripping means and the overshot when the gripping means is contracted so as to limit the downward movement of the gripping means relative to the barrel.

4. A fishing tool comprising a barrel adapted to be lowered in a well, an overshot shoe at the lower end of the barrel adapted to be lowered over a "fish", normally expanded gripping means reciprocably mounted in the barrel, resilient means constantly tending to maintain said gripping means expanded, and means for positively contracting said gripping means when the latter is moved to a predetermined position in the barrel.

5. A fishing tool comprising a barrel, an overshot shoe at the lower end of the barrel, a slip assembly reciprocably mounted in the barrel and normally assuming a fully expanded position therein, resilient means constantly tending to maintain said slip assembly expanded, and complemental parts on the slip assembly and on the overshot shoe for contracting said slip assembly when the same is moved to a predetermined position in the barrel.

6. A fishing tool comprising a barrel, an overshot shoe at the lower end of the barrel, a slip assembly reciprocably mounted in the barrel and normally assuming a fully expanded position therein, resilient means constantly tending to maintain said slip assembly expanded, and complemental parts on the slip assembly and on the overshot shoe for contracting said slip assembly when the same is moved to a predetermined position in the barrel, and means for limiting the downward movement of the slip assembly in the barrel.

7. A fishing tool comprising a barrel, an overshot shoe at the lower end of the barrel, an expansible slip assembly reciprocably mounted in the barrel, springs constantly urging said assembly to its fully expanded position, complemental parts on the slip assembly and on the overshot shoe for contracting said slip assembly when the same is moved to a predetermined position in the barrel, and an abutment between the slip assembly and the barrel when the slip assembly is contracted.

8. In a tool of the character described, a hollow member capable of surrounding one end of a "fish", a beveled shoulder in said member, a slip assembly mounted therein, a beveled shoulder on said slip assembly engageable with said first named beveled shoulder to contract the slip assembly, and a second beveled shoulder on the slip assembly engageable with said first named beveled shoulder to limit downward movement of the slip assembly.

9. In a fishing tool of the character described, a barrel adapted to be passed over and surround one end of a "fish" and a slip assembly slidably mounted therein, said slip assembly comprising separate members arranged circumferentially of the interior of the barrel, and springs interposed between said members to urge them radially outwardly.

VINCENT O. VANCE.